United States Patent [19]
Albers, Jr.

[11] Patent Number: 5,637,215
[45] Date of Patent: Jun. 10, 1997

[54] FUEL FILTER HAVING IMPROVED COMMUNICATION WITH A CONTAMINANT CONTAINER

[75] Inventor: David G. Albers, Jr., Alma, Ark.

[73] Assignee: Purolator Products Company, Tulsa, Okla.

[21] Appl. No.: 544,800

[22] Filed: Oct. 18, 1995

[51] Int. Cl.$^6$ .................................................. B01D 35/02
[52] U.S. Cl. ........................ 210/305; 210/444; 210/450; 210/455
[58] Field of Search ........................ 210/299, 304, 210/305, 444, 453, 455, 307, 440, 443, 450, 452

[56] References Cited

U.S. PATENT DOCUMENTS

| | | | |
|---|---|---|---|
| 2,170,074 | 8/1939 | Hewitt | 210/444 |
| 3,637,078 | 1/1972 | Hollar | 210/304 |
| 4,740,299 | 4/1988 | Popoff et al. | 27/8 |
| 5,110,460 | 5/1992 | Gilas | 210/444 |
| 5,244,571 | 9/1993 | Church et al. | 210/444 |

FOREIGN PATENT DOCUMENTS

| | | | |
|---|---|---|---|
| 1091587 | 11/1967 | United Kingdom | 210/444 |

*Primary Examiner*—Matthew O. Savage
*Attorney, Agent, or Firm*—Joseph V. Tassone

[57] ABSTRACT

A fuel filter having improved communication with a contaminant container employs a body with a fuel inlet and fuel outlet having a housing connected at its upper end to the body, the housing having a bottom opening therethrough. A filter element is retained within the housing, the filter element having a bottom end. An interior passageway is provided in the filter element in communication with the body fuel outlet, the exterior of the filter element being in communication with the body fuel inlet. A support plate is positioned within the lower end portion of the housing on which the filter bottom end rests. A contaminant container is supported to the housing bottom. The support plate has a spiral fluid passageway providing communication between the interior of the housing and the contaminant container, the passageway permitting liquid contaminant, such as water, to flow from the interior of the housing into the contaminant container. The spiral fluid passageway serves to substantially isolate the interior of the contaminant container from fluid turbulence within the housing.

8 Claims, 2 Drawing Sheets

FUEL FILTER HAVING IMPROVED COMMUNICATION WITH A CONTAMINANT CONTAINER

BACKGROUND OF THE INVENTION

This invention relates to a fuel filter having a contaminant container of the type that is commonly employed as a part of the fuel system of an internal combustion engine. "Fuel" as used herein refers to liquid fuel such as gasoline, diesel or other liquid fuels. When fuel is stored in a vessel, particularly a metal fuel tank wherein the temperature of the tank can readily change, it is common for water to collect in the fuel as a consequence of condensation. Water is immiscible with most fuels, including gasoline and diesel, and is a serious contaminant. Water can freeze in a fuel line and block the flow of fuel. Further, water causes corrosion of metal parts of the fuel system.

For these reasons, it is desirable to remove water and other non-immiscible contaminants from fuel. To this end, others in the past have provided fuel filters that have a contaminant collection container positioned on the bottom of the fuel filter housing into which water and other non-immiscible contaminants can be collected.

As a specific example of a fuel filter of this type, reference may be had to U.S. Pat. No. 4,740,299 entitled "Fuel Assembly With Threaded Collection Bowl". This patent discloses a fuel filter having a fuel inlet and outlet and a housing in which a filter element is removably positioned. Below the housing is a collection bowl. A collector ring is positioned within the housing and the fuel element rests on the collector ring. The collector ring has a downwardly extending tubular portion with external threads that threadably receives the collection bowl. To provide flowage passageways from the interior of the filter housing to the collection bowl, the collection ring is provided with radially extending ribs. Thus, water or other contaminants flowing into the interior of the filter housing and exterior of the filter element may pass by gravity downwardly and flow between the upstanding ribs of the collector ring into the collection bowl.

The filter assembly as revealed in this patent introduces a potential problem in that turbulence of fuel flow through the filter is easily communicated between the interior of the filter housing and the collection bowl by the short, open passageways between upstanding ribs on the collector ring. An object of the present invention is to provide a fuel filter having improved communication with a contaminant container in such a way that any turbulence of fuel flow within the filter housing is isolated from the interior of the contaminant container.

The references cited in U.S. Pat. No. 4,740,299 provide further background information as to prior art relating to the present invention.

SUMMARY OF THE INVENTION

A fuel filter having improved communication with a contaminant container has a body with a fuel inlet port and a fuel outlet port. Attached to the body is a housing with a cylindrical peripheral wall. A filter element is positioned within the housing, the filter element serving to separate the housing into a central fuel chamber and a peripheral fuel chamber. The peripheral fuel chamber is disposed between the exterior of the filter element and the casing. The filter element is disposed intermediate the fuel inlet and fuel outlet ports to thereby place the filter element in the fuel flow path.

A support plate is positioned within the bottom of the housing. Secured exteriorly to the filter housing and below it is a contaminant container. The contaminant container may be transparent so that collected contaminant can be visually observed.

A spiral ledge is formed on the upper surface of the support plate. The bottom surface of the filter element rests on the spiral ledge. A flow channel is provided by the spiral ledge. The flow channel communicates the peripheral fuel chamber within the housing with the contaminant container. Fuel having contaminant, such as water therein, first enters the peripheral fuel chamber where water, by gravity, can separate out. Water collected in the bottom portion of the filter housing flows by way of the spiral contaminant channel into the collection vessel.

The spiral contaminant channel serves to substantially isolate the interior of the contaminant container from any turbulence occurring within the filter housing. That is, there are no short, direct passageways between the interior of the housing and the contaminant container. Instead, the spiral ledge provided on the support plate in the present invention provides a long, spiraled passageway communicating the interior of the filter housing with the contaminant container that permits the flow of contaminant therethrough but resists communication of turbulence between the interior of the filter housing and the contaminant container.

A better understanding of the invention will be obtained from the following detailed description of the preferred embodiment, taken in conjunction with the attached drawings.

DESCRIPTION OF THE PREFERRED EMBODIMENTS

Figure 1:
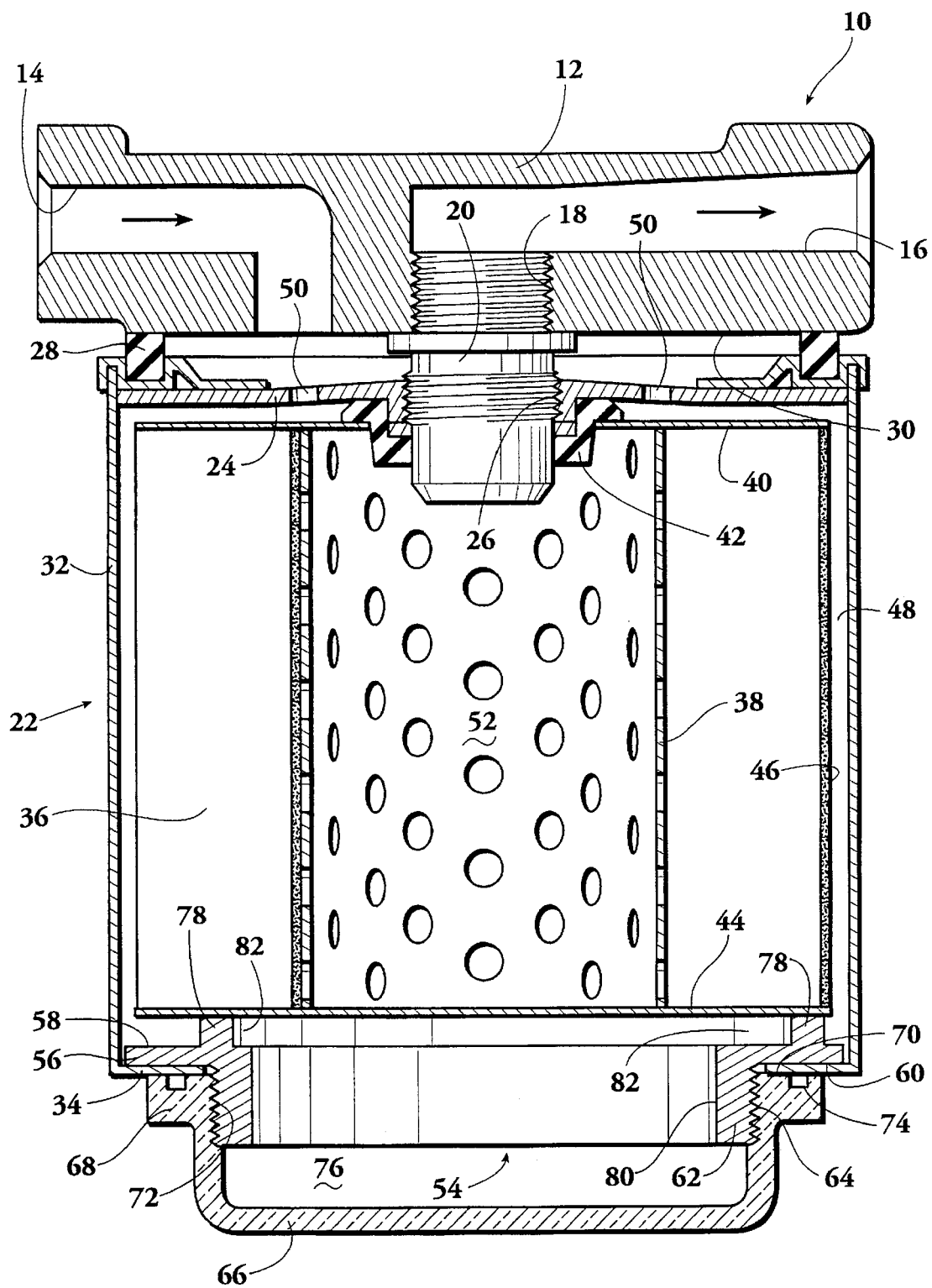
FIG. 1 is an elevational cross-sectional view of a fuel filter having improved communication with a contaminant container.

FIG. 1 is a cross-sectional illustration of a preferred embodiment of the invention wherein the fuel filter having improved communication with a contaminant container is generally indicated by the numeral 10. The fuel filter is adapted to mount to a body 12 having a fuel inlet 14 and a fuel outlet 16. A centrally threaded passageway 18 receives a tubular coupling 20.

Threadably attached to tubular coupling 20 is a filter housing indicated generally by 22. Filter housing 22 includes a top plate 24 having a threaded central opening 26 that threadably receives tubular coupling 20. Thus, tubular coupling 20 provides means for attachment of filter housing 22. Top plate 24 includes provisions for a circumferential gasket 28 that engages the lower surface 30 of body 12.

Housing 22 includes a tubular wall 32 having an inwardly folded lower end 34.

Received within filter housing 22 is a filter element 36 that has a perforated center tube 38. Filter element 36 has an upper end plate 40 with a tubular opening that receives gasket 42 that sealably engages the exterior surface of tubular coupling 20. The filter element 36 further has a lower end plate 44 that closes the lower end of center tube 38. Surrounding center tube 38 is a filter media having an external surface 46. The annular space between the exterior surface 46 of filter element 36 and the interior of housing tubular wall 22 provides a peripheral fuel chamber 48. Openings 50 in top plate 24 provide communication between fuel inlet 14 and peripheral fuel chamber 48 so that fuel entering the fuel filter flows into the interior of housing 22 to surround the exterior surface 46 of filter element 36. Fuel is filtered as it migrates through filter element 36 into the interior of perforated center tube 38. The interior of the perforated center tube provides a central fuel chamber 52. Fuel outlet 16 is in communication with central fuel chamber 52 through tubular coupling 20.

Figure 2:
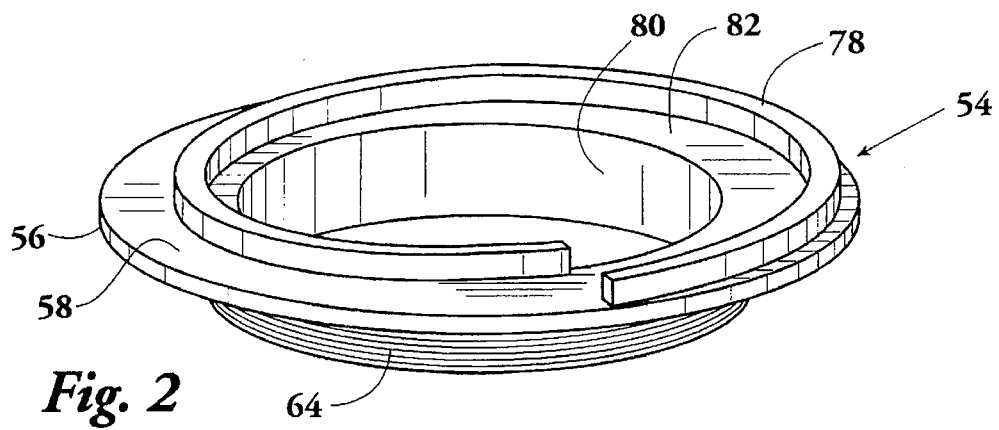
FIG. 2 is an isometric view of the support plate employed in the fuel filter of FIG. 1.
Figure 3:
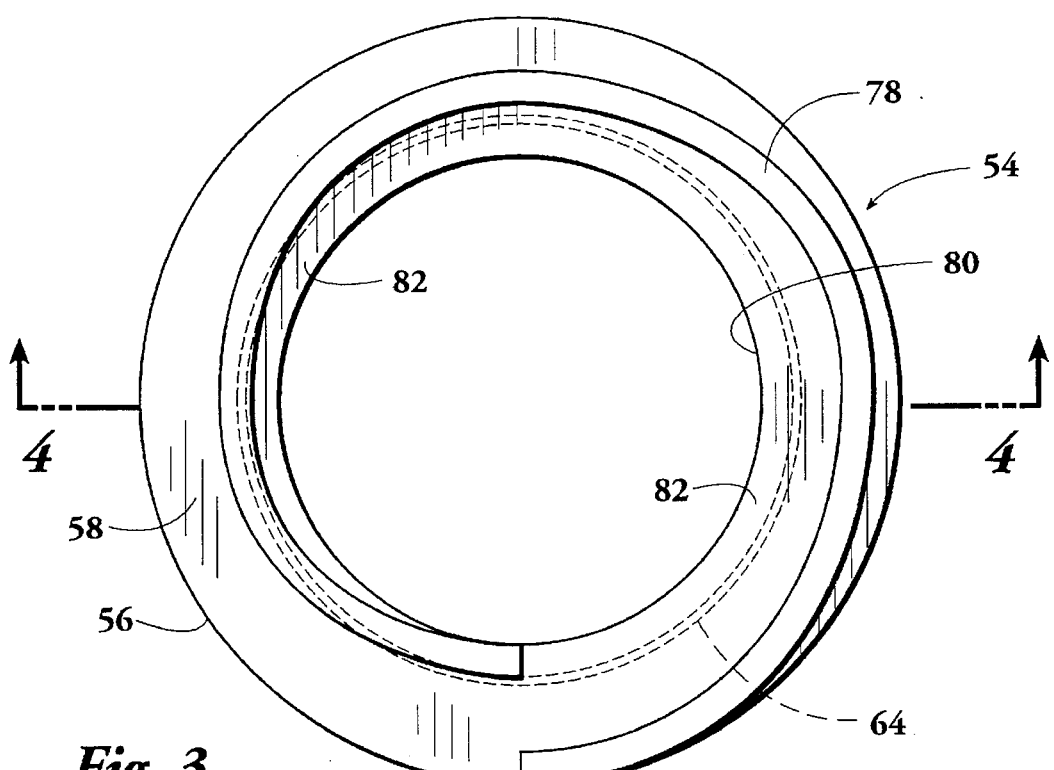
FIG. 3 is a top plan view of the support plate.
Figure 4:
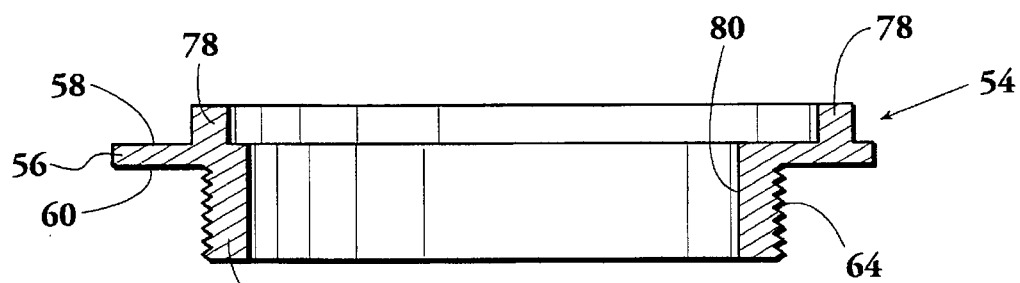
FIG. 4 is an elevational cross-sectional view of the support plate as taken along the line 4—4 of FIG. 3.

Positioned partially within filter housing 22, in the lower end thereof, is a support plate generally indicated by numeral 54 that is seen in detail in FIGS. 2, 3 and 4. Support plate 54 has an integral radially extending flange portion 56 providing an upper surface 58 and a lower surface 60. Support plate 54 further has an integral downwardly extending tubular portion 62 having an external circumferential surface with threads 64.

Support plate flange lower surface 60 engages the interior of inwardly folded lower end 34 of housing 22 so that thereby the support plate 54 is secured to the housing 22.

Threadably attached to the support plate tubular portion 62 is a contaminant container 66 (see FIG. 1) having an integral radially extended flange portion 68 with an upper flange surface 70. The upper interior of contaminant container 66 is provided with internal threads 72 that threadably engage threads 64 of the support plate tubular portion 62. A circumferential groove 74 is formed in contaminant container upper surface 70, the groove 74 being adaptable to receive an O-ring (not shown) so that the upper end of the contaminant container 66 is sealably secured to inwardly folded lower end 34 of filter housing 22. In this manner, the interior 76 of contaminant container 66 is in closed communication with the interior of housing 22 and specifically, in communication with the peripheral fuel chamber 48 within the housing 22.

Integrally formed on upper surface 58 of support plate flange portion 56 (see FIGS. 2, 3 and 4) is an upstanding spiraled ledge 78. As shown in FIGS. 2 and 3, the spiral ledge 78 begins on the Upper surface 58 adjacent the external periphery of the support plate flange portion 56 and spirals to terminate adjacent a tubular opening 80 in the support plate 54. The upstanding spiral ledge 78 provides a spiral fuel passageway 82 that communicates the interior of contaminant container 66 with peripheral fuel chamber 48 of housing 22.

When fuel enters inlet 14 and flows into peripheral fuel chamber 48 to surround fuel element 36, any water or other immiscible contaminant that is heavier than the fuel including, dirt, sand, rust, etc., will settle by gravity to the interior lower end of the housing and flow by way of spiral passageway 82 into contaminant container 66. The fuel filter lower end plate 44 that rests on a support surface defined by the upstanding ledge 78 and forms the upper boundary of passageway 82.

The provision of a spiral passageway 82 communicating the interior of the filter housing with the interior of contaminant container 66 has the important advantage that it isolates the interior of the contaminant container 66 from turbulence of fuel flow within filter housing 22. That is, the long spiral passageway 82 provides free flow of contaminant from the housing 22 into the contaminant container 66 but shields the contaminant container 66 from any turbulence of fuel within the housing 22 that would otherwise tend to recombine the fuel with contaminant that has been separated and that has passed into the contaminant container 66.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A fuel filter comprising:

a body having a fuel inlet and an fuel outlet;

a housing connected at its upper end to said body and having a bottom end with an opening therethrough;

a contaminant container supported to said bottom end of the housing;

a filter element retained within said housing above said contaminant container, said filter element having a bottom end and an interior passageway in communication with said fuel outlet, the filter element having an exterior that is in communication with said fuel inlet; and a support plate including an upper surface positioned within a lower end portion of the housing above said contaminant container, said upper surface of the support plate having a spiral upstanding ledge, said upstanding ledge defining a support surface, said bottom end of the filter element resting on said support surface of said upstanding ledge, a spiral fluid passageway being formed between adjacent portions of said ledge and said bottom end of the filter element providing communication between said housing and said contaminant container.

2. A fuel filter according to claim 1 wherein said support plate has an integral tubular portion extending downwardly through said opening in the bottom end of said housing and having external threads thereon, and wherein said contaminant container is threadably attached to said tubular portion of the support plate.

3. A fuel filter according to claim 1 wherein said support plate has a radially extending flange portion having said upper surface and an integral tubular portion extending downwardly through said opening in said bottom end of the housing, the tubular portion having external threads thereon, said spiraled fluid passageway being provided on said upper surface of the flange portion, said tubular portion having threads thereon, said contaminant container being threadably attached to said tubular portion of the support plate.

4. A fuel filter according to claim 3 wherein said flange portion of the support plate has a lower surface and wherein said contaminant container has an upper circumferential edge and wherein said bottom end of the housing includes a radially inwardly extending portion surrounding said opening in the bottom end of the housing, said radially inwardly extending portion being captured between said lower surface of the flange portion and said upper circumferential edge of the contaminant container.

5. A fuel filter comprising:

a housing having a bottom end, a cylindrical peripheral wall, and first and second fuel ports defining a fuel flow path;

a filter element positioned with said housing and separating a central fuel chamber from a peripheral fuel chamber, the peripheral fuel chamber being disposed between said filter element and said peripheral wall of the housing, said filter element being disposed intermediate said first and second fuel ports in said fuel flow path;

a contaminant container connected to said bottom end of the housing; and a support plate positioned between said filter element and said contaminant container and having an upper surface having a spiraled upstanding ledge, said upstanding ledge defining a support surface, said filter element having an end surface in contact with said support surface of said upstanding ledge, a spiraled fluid passageway being formed between adjacent portions of said ledge and said end surface of the filter element providing communication between said peripheral fuel chamber and said contaminant chamber.

6. A fuel filter according to claim 5 wherein said support plate has an integral tubular portion extending downwardly from said housing and having external threads thereon, and wherein said contaminant container is threadably attached to said tubular portion of the support plate.

7. A fuel filter according to claim 5 wherein said support plate has a radially extending flange portion having said upper surface and an integral tubular portion extending downwardly from said housing and external threads thereon, said spiraled upstanding ledge being formed on said upper surface of the flange portion, said tubular portion having threads thereon, said contaminant container being threadably attached to said tubular portion of the support plate.

8. A fuel filter according to claim 7 wherein said flange portion of the support plate has a lower surface and wherein said contaminant container has an upper circumferential edge and wherein said bottom end of the housing includes a radially inwardly extending portion captured between said lower surface of the flange portion and said upper circumferential edge of the contaminant container.

* * * * *